(12) United States Patent
Varney

(10) Patent No.: US 12,025,177 B2
(45) Date of Patent: Jul. 2, 2024

(54) UNIVERSAL COUPLING FOR HOLLOW CARBON FIBER COMPOSITE STRUCTURES

(71) Applicant: Robert Varney, Topsfield, MA (US)

(72) Inventor: Robert Varney, Topsfield, MA (US)

(*) Notice: Subject to any disclaimer, the term of this patent is extended or adjusted under 35 U.S.C. 154(b) by 0 days.

(21) Appl. No.: 17/490,324

(22) Filed: Sep. 30, 2021

(65) Prior Publication Data
US 2022/0128074 A1    Apr. 28, 2022

Related U.S. Application Data

(60) Provisional application No. 63/106,213, filed on Oct. 27, 2020.

(51) Int. Cl.
*F16B 7/04* (2006.01)

(52) U.S. Cl.
CPC .......... *F16B 7/042* (2013.01); *F16B 2200/67* (2023.08); *Y10T 403/55* (2015.01); *Y10T 403/555* (2015.01); *Y10T 403/604* (2015.01); *Y10T 403/7091* (2015.01)

(58) Field of Classification Search
CPC ...... F16B 7/042; Y10T 403/42; Y10T 403/55; Y10T 403/555; Y10T 403/604; Y10T 403/7091
USPC ...................... 403/205, 292, 295, 328, 379.6
See application file for complete search history.

(56) References Cited

U.S. PATENT DOCUMENTS

| | | |
|---|---|---|
| 389,335 A | 9/1888 | Spearz |
| 3,118,696 A | 1/1964 | Conny |
| 3,347,575 A | 10/1967 | Morris |
| 3,449,003 A | 6/1969 | Hunt |
| 3,847,393 A | 11/1974 | Busselmeier |
| 4,079,978 A | 3/1978 | McMullin |
| 4,852,597 A | 8/1989 | Mark et al. |
| 5,083,883 A | 1/1992 | Ueda et al. |
| 5,127,762 A * | 7/1992 | Havlovitz ............... F16B 7/042 403/328 |
| 5,143,476 A | 9/1992 | Pruis |

(Continued)

FOREIGN PATENT DOCUMENTS

| | | |
|---|---|---|
| CL | CH591832 A5 | 9/1977 |
| DE | 10325991 A1 | 12/2004 |

(Continued)

OTHER PUBLICATIONS

Non-Final Office Action in U.S. Appl. No. 17/590,589, dated: Apr. 1, 2024.

*Primary Examiner* — Greg Binda
(74) *Attorney, Agent, or Firm* — Morse, Barnes-Brown & Pendleton, P.C.; Sean D. Detweiler, Esq.

(57) ABSTRACT

A system and process for removably and replaceably coupling two hollow carbon fiber composite structures without the need for adhesives or welding. A universal coupling makes use of reciprocating catches in the end regions of the universal coupling. The reciprocating catches engage receiving features provided in the hollow carbon fiber composite structures to couple the hollow carbon fiber composite structures to the universal coupling, and through the universal coupling, couple the hollow carbon fiber composite structures together. The hollow carbon fiber composite structures can be uncoupled by disengaging the reciprocating catches of the universal coupling from the receiving features of the hollow carbon fiber composite structures.

17 Claims, 20 Drawing Sheets

(56) References Cited

U.S. PATENT DOCUMENTS

| | | |
|---|---|---|
| 5,255,993 A | 10/1993 | Kovacs |
| 5,387,048 A | 2/1995 | Kuo |
| 5,702,198 A | 12/1997 | Kuo |
| 5,744,745 A | 4/1998 | Shim et al. |
| 5,941,575 A | 8/1999 | Herbst |
| 6,213,672 B1 | 4/2001 | Varga |
| 6,263,895 B1 | 7/2001 | Bang |
| 6,676,326 B2 | 1/2004 | Wu |
| 6,782,903 B1 | 8/2004 | Jarman et al. |
| 7,967,259 B2 | 6/2011 | Nakatani |
| 8,434,963 B2 * | 5/2013 | Alkas ............... F16B 7/042 403/292 |
| 8,469,423 B1 | 6/2013 | Crowley, Jr. et al. |
| 8,485,751 B2 | 7/2013 | Vetesnik |
| 8,926,214 B2 | 1/2015 | Lah |
| 10,077,791 B2 | 9/2018 | Kresge |
| 10,288,123 B2 | 5/2019 | Newth |
| 10,844,626 B2 | 11/2020 | Yang et al. |
| 2005/0019138 A1 | 1/2005 | Stockler |
| 2008/0079302 A1 | 4/2008 | Grove |
| 2008/0089740 A1 | 4/2008 | Cirio |
| 2009/0085022 A1 | 4/2009 | Svedberg |
| 2009/0095856 A1 | 4/2009 | Nakatani |
| 2010/0054855 A1 | 3/2010 | Young |
| 2010/0122718 A1 | 5/2010 | Lah |
| 2011/0002731 A1 | 1/2011 | Vetesnik |
| 2011/0123258 A1 | 5/2011 | Braun et al. |
| 2012/0163879 A1 | 6/2012 | Joo et al. |
| 2012/0189376 A1 | 7/2012 | Kardohely |
| 2012/0288326 A1 | 11/2012 | Lah |
| 2013/0236237 A1 | 9/2013 | Schmidt |
| 2014/0064842 A1 | 3/2014 | Lin |
| 2014/0348574 A1 | 11/2014 | Jahner et al. |
| 2014/0376990 A1 | 12/2014 | Lai |
| 2016/0348730 A1 | 12/2016 | Newth |
| 2021/0317654 A1 | 10/2021 | Lu |
| 2022/0252096 A1 * | 8/2022 | Varney ............... F16B 7/22 |

FOREIGN PATENT DOCUMENTS

| | | |
|---|---|---|
| DE | 102004018750 A1 | 11/2005 |
| DE | 102013016482 A1 | 7/2014 |
| DE | 102013106496 B3 | 11/2014 |
| GB | 191003679 A | 12/1910 |
| GB | 2433272 A | 6/2007 |
| GB | 2494306 A | 3/2013 |
| WO | 0017528 A1 | 3/2000 |

\* cited by examiner

UNIVERSAL COUPLING FOR HOLLOW CARBON FIBER COMPOSITE STRUCTURES

CROSS-REFERENCE TO RELATED APPLICATION(S)

This application claims priority to, and the benefit of, U.S. Provisional Application No. 63/106,213, filed Oct. 27, 2020, for all subject matter common to both applications. The disclosure of said provisional application is hereby incorporated by reference in its entirety.

FIELD OF THE INVENTION

The present invention relates to couplings suitable for coupling hollow carbon fiber composite structures. In particular, the present invention relates to devices and methods for coupling hollow carbon fiber composite structures together without requiring adhesive or welding, and without requiring the coupling be made of carbon fiber material.

BACKGROUND

Carbon fiber is widely regarded today as an important and versatile material enabling stronger and lighter components to be built compared to steel or aluminum. The difficulty of mass-producing carbon fiber structures is still a prevalent reason why this material has not had its proper introduction into the everyday lives of people around the world. This material is used primarily in the aviation, aerospace, and defense industries. In these industries the cost of producing structures is not as important as the characteristics of the material because the material properties enable applications and designs that were not previously possible without the use of carbon fiber. Other uses in the manufacturing industry include automotive, wind energy, construction, and sports applications.

At present, the technique for constructing a carbon fiber structure includes the use of an epoxy, a sleeve (structural component to connect two join the two pieces), and a foam plug. This process involves the sanding or surface prep of all carbon fiber components where the epoxy is to be applied, then the assembly and application of the epoxy into the tube to allow the components to be permanently attached once the epoxy has dried. Curing requires monitoring and management of several environmental factors, including temperature and humidity. As such, carbon fiber components are generally constructed in highly controlled environments to ensure that the epoxy that is holding the two carbon fiber structures together has cured to the desired strength. A second option is the use of fasteners to attached two carbon fiber structures, typically also using a sleeve that slides over or into the carbon fiber structure that can then be fastened together. Some of these designs use an expanding insert that pushes against the structure of the carbon fiber structure. This technique does appear at first to be a faster method of attachment of two carbon fiber structures; however, the current market offering uses expensive and sometimes complicated mechanisms to facilitate such couplings, especially for complicated or non-traditional shapes.

SUMMARY

There is a need for a system and process for coupling, joining, or otherwise connecting carbon fiber composite structures that does not require adhesives, welds, or complicated or expensive couplings. The present invention is directed toward further solutions to address this need, in addition to having other desirable characteristics.

The technology of the present invention uses no adhesives, welds, or complex and expensive fasteners. The system and process allow two carbon fiber structures to be permanently or temporarily attached in seconds and without a need for careful measuring of an epoxy or reliance upon ideal temperature and humidity conditions. A universal coupling provided by the present invention enables the mass production of hollow carbon fiber structures of nearly any shape to be structurally coupled to each other. The inventive system and process can be manufactured using up-to-date conventional manufacturing equipment in seconds and can be easily integrated into manufacturing plants already producing carbon fiber components. The removal of material in strategic areas of the carbon fiber structure allows a customizable universal coupling system to attach the two components. The inventive system and process comprises a universal coupling system that can be modified to allow nearly any number of applications to be used. From a manufacturing perspective, readily available shapes of carbon fiber tubes and profiles can now be modified within the same facility they are produced in to allow the end user to perform assembly and construction of carbon fiber structures in seconds. In the construction industry, carbon fiber tubes and other shapes are used largely as lightweight reinforcement structures during a concrete pour. Instead of carbon fiber being a reinforcement structure, the present invention now enables the carbon fiber components to be the frame of the structure. This is done by processing the carbon fiber component to allow any number of shapes to be removed from the structure to form apertures that serve as receiving features. Once the end user is ready to assemble the components, the universal coupling easily slides into the carbon fiber structure where a spring or other mechanically activated catch system positively locks into the shapes previously processed into the structure and results in a flush outer wall surface of the coupled structures. The way the catch and carbon fiber tube are processed allows the quick visual and audible inspection of the two components to ensure a secure connection. The process is simple enough that it can be modified in any number of ways that will allow the automated assembly of components where a simple visual inspection by a laser or camera system can allow the quality control process to happen very quickly.

This system and process are significant to the carbon fiber industry in several ways. Standardized sizes of carbon fiber tubes and shapes across the industry means the process is operable using any manufacturer that currently has a product line that falls within the standardized profile size and shapes currently offered. For the end user, this means the ability to purchase materials from anywhere in the world and have them processed so that when the components arrive at an assembly site there is a uniform assembly process with known guidelines and detent systems that work for that particular size or shape of carbon fiber structure. From a construction standpoint this can also modernize and standardize the construction of entire structures by scaling. The system and process can be modified in myriad ways which means that structures, once designed, can be accurately and quickly scaled for production. The system and process and the accompanying can be easily replicated in stress analysis software to allow the optimal design of the structure be realized.

The inventive system and process can be rapidly integrated into industries that would otherwise not utilize carbon fiber as a material in their products. Entire consumer electronics and other products can be made from custom carbon fiber shaped hollow structures and then assembled by a robot without the use of adhesives. Prior to the present invention, a carbon fiber manufacturer tasked with permanently attaching one-hundred different shaped carbon fiber components together into a single structure would require all joints to be epoxied or otherwise permanently fastened into place. This would be a monumental task requiring a significant amount of time coupled with highly skilled workers specific to the laminate industry to accurately and quickly attach these components. With the present invention the carbon fiber component only needs to be processed in a single operation which allows the adaptable universal coupling system to be used to attach two or more carbon fiber structures together in seconds without the worry of temperature or humidity, and without a single screw driver or special designed tools. Entire buildings and carbon fiber structures can now be quickly assembled accurately without requiring skilled workers. What this means for a mass production standpoint is that entire products can be redesigned to allow the easy assembly of carbon components without the need for specialized fasteners or equipment. assembly of the inventive universal coupling provides a predictable manor in which the components need to be aligned prior to assembly. The reciprocating catch of the universal coupling finishing at or below the surface of the carbon structure allows the sleek and non-invasive design of the components be achieved. The inventive system and process enables smaller, lighter components to be mass produced from carbon fiber like never before and be done in an extremely accurate and safe manor. The inventive system and process will allow the standardization of the carbon fiber manufacturing industry finally be realized for the first time since 1963.

In accordance with example embodiments of the present invention, a universal coupling for removably and replaceably coupling a first hollow carbon fiber composite structure having at least one first receiving feature and a second hollow carbon fiber composite structure having at least one second receiving feature is provided. The universal coupling includes a body having a first mating end region having a first mating end, a second mating end region having a second mating end that are at an opposite end of the body from the first mating end region and the first mating end, and at least one body sidewall spanning therebetween and structurally connecting the first mating end region and first mating end with the second mating end region and second mating end. The universal coupling also includes at least one first mating end catch and at least one second mating end catch. The at least one first mating end catch is disposed in the at least one body sidewall at the first mating end region. The at least one first mating end catch reciprocates by extending outward from the body to an engaged position and retracting inward to the body to a dis-engaged position. The at least one first mating end catch is structurally sized and positioned in such a way that engages the at least one first receiving feature of the first hollow carbon fiber composite structure when the first mating end is placed in a predetermined coupled position and orientation inside the first hollow carbon fiber composite structure with the at least one first mating end catch in the engaged position into the at least one first receiving feature. The at least one second mating end catch is disposed in the at least one body sidewall at the second mating end region. The at least one second mating end catch reciprocates by extending outward from the body to an engaged position and retracting inward to the body to a dis-engaged position. The at least one second mating end catch is structurally sized and positioned in such a way that engages the at least one second receiving feature of the second hollow carbon fiber composite structure when the second mating end is placed in a predetermined coupled position and orientation inside the second hollow carbon fiber composite structure with the at least one second mating end catch in the engaged position into the at least one second receiving feature. The universal coupling is removable and replaceable and fixedly couples the first hollow carbon fiber composite structure with the second hollow carbon fiber composite structure without requiring adhesive or welding.

In accordance with aspects of the present invention, the universal coupling is manufactured of a material that is not required to be carbon fiber composite, even when utilized to join two carbon fiber based structures. In some such aspects, the body comprises machined aluminum.

In accordance with aspects of the present invention, the body further includes a through hole extending from the first mating end to the second mating end. In some such aspects, the universal coupling further includes a first seal at the first mating end region and a second seal at the second mating end region, the first seal creating a fluid-tight seal between the first mating end region of the universal coupling and the first hollow carbon fiber composite structure, the second seal creating a fluid-tight seal between the second mating end region of the universal coupling and the second hollow carbon fiber composite structure.

In accordance with aspects of the present invention, when the at least one first mating end catch engages the at least first receiving feature of the first hollow carbon fiber composite structure in the engaged position, the at least one first mating end catch is sized and configured in such a way that it is flush with an outer wall of the first hollow carbon fiber composite structure at the at least one first receiving feature.

In accordance with aspects of the present invention, when the at least one second mating end catch engages the at least one second receiving feature of the first hollow carbon fiber composite structure in the engaged position, the at least one second mating end catch is sized and configured in such a way that it is flush with an outer wall of the first hollow carbon fiber composite structure at the at least one second receiving feature.

In accordance with aspects of the present invention, the universal coupling further includes a plurality of first mating end catches and a plurality of second mating end catches.

In accordance with aspects of the present invention, at least one of the first mating end catch and second mating end catch includes a recess in the sidewall of the first mating end region or second mating end region and a spring-loaded reciprocatable pin disposed within the recess.

In accordance with aspects of the present invention, the at least one first receiving feature comprises at least one first aperture and the at least one second receiving feature comprises at least one second aperture.

In accordance with aspects of the present invention, the at least one body sidewall has an elbow form such that the first hollow carbon fiber composite structure is coupled to the second first hollow carbon fiber composite structure at an angle.

In accordance with embodiments of the present invention, a method of removably and replaceably coupling a first hollow carbon fiber composite structure having at least one first receiving feature and a second hollow carbon fiber composite structure having at least one second receiving feature without requiring adhesive or welding is provided. The method includes providing a first hollow carbon fiber composite structure having a first receiving feature, providing a second hollow carbon fiber composite structure having a second receiving feature, providing a universal coupling as set forth herein, placing the first mating end inside the first hollow carbon fiber composite structure and engaging the at least one first receiving feature of the first hollow carbon fiber composite structure with the at least one first mating end catch of the first mating end region, and placing the second mating end inside the second hollow carbon fiber composite and structure engaging the at least one second receiving feature of the second hollow carbon fiber composite structure with the at least one second mating end catch of the second mating end region. This results in the removable and replaceable coupling of the first hollow carbon fiber composite structure with the second hollow carbon fiber composite structure without requiring adhesive or welding.

In accordance with aspects of the present invention, engaging the at least one first receiving feature of the first hollow carbon fiber composite structure with the at least one first mating end catch of the first mating end region includes retracting the at least one first mating end catch to a disengaged position; mating the first mating end with the first receiving feature of the first hollow carbon fiber composite structure, wherein the first hollow carbon fiber composite structure is in a predetermined coupled position and orientation; and extending the at least one first mating end catch to an engaged position.

In accordance with aspects of the present invention, engaging the at least one second receiving feature of the second hollow carbon fiber composite structure with the at least one second mating end catch of the second mating end region includes retracting the at least one second mating end catch to a disengaged position. The second mating end is mated with the second receiving feature of the second hollow carbon fiber composite structure, wherein the second hollow carbon fiber composite structure is in a predetermined coupled position and orientation. The at least one second mating end catch is extended to an engaged position.

In accordance with aspects of the present invention, the method further includes uncoupling the first hollow carbon fiber composite structure. The uncoupling includes retracting the at least one first mating end catch to a disengaged position and disengaging the first mating end from the at least one first receiving feature of the first hollow carbon fiber composite structure, wherein the first hollow carbon fiber composite structure is moved from the predetermined coupled position and orientation.

In accordance with aspects of the present invention, the method further includes uncoupling the second hollow carbon fiber composite structure. The uncoupling includes retracting the at least one second mating end catch to a disengaged position and disengaging the second mating end from the at least one second receiving feature of the second hollow carbon fiber composite structure, wherein the second hollow carbon fiber composite structure is moved from the predetermined coupled position and orientation.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
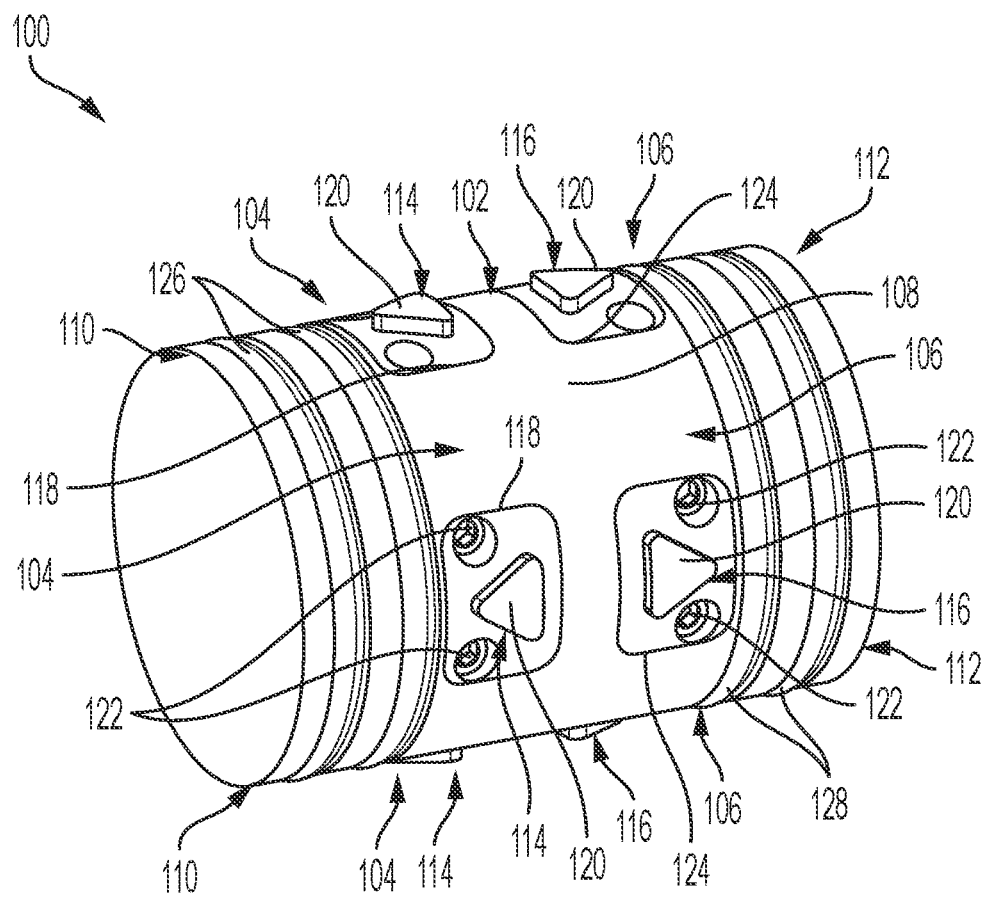
FIG. 1 is a perspective view of an example universal coupling in accordance with an embodiment of the present invention.

An illustrative embodiment of the present invention relates to a universal coupling system and process that can removably and replaceably couple two hollow carbon fiber composite structures without the need for adhesives or welding or complex expensive fasteners. There is no requirement for the universal coupling to be made of a carbon fiber based material. The universal coupling makes use of reciprocating catches in the end regions of the universal coupling. The reciprocating catches engage receiving features provided in the hollow carbon fiber composite structures to couple the hollow carbon fiber composite structures to the universal coupling, and through the universal coupling, couple the hollow carbon fiber composite structures together. The hollow carbon fiber composite structures can be uncoupled by disengaging the reciprocating catches of the universal coupling from the receiving features of the hollow carbon fiber composite structures as desired.

FIGS. 1 through 20 wherein like parts are designated by like reference numerals throughout, illustrate an example embodiment or embodiments of a universal coupling and process for coupling carbon fiber composite structures without requiring adhesive or welding, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 2:
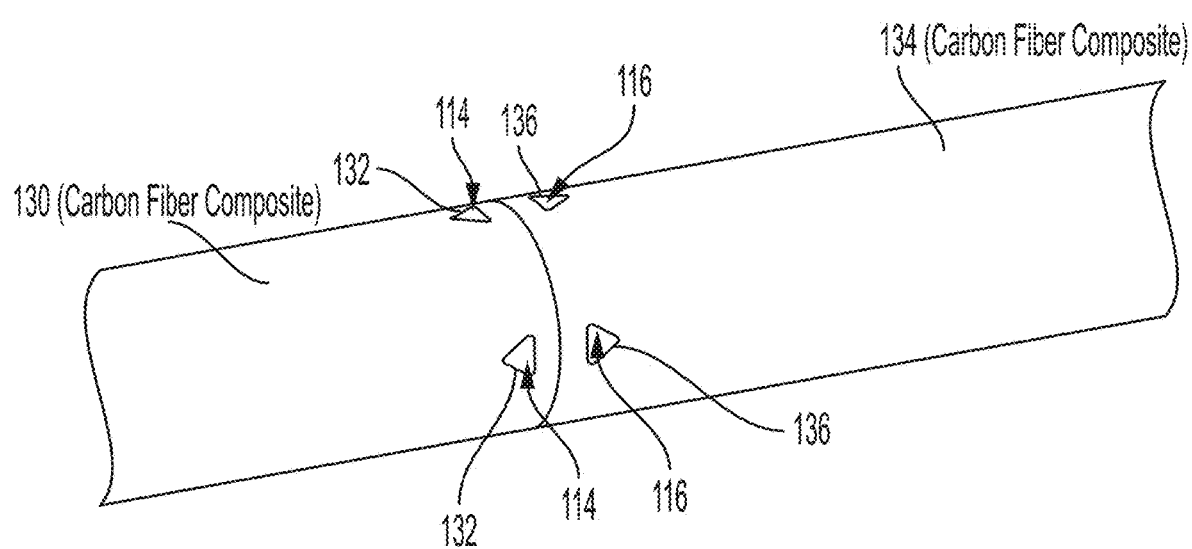
FIG. 2 is a perspective view of two hollow carbon fiber composite structures coupled together with the universal coupling of FIG. 1 in accordance with an embodiment of the present invention.
Figure 3:
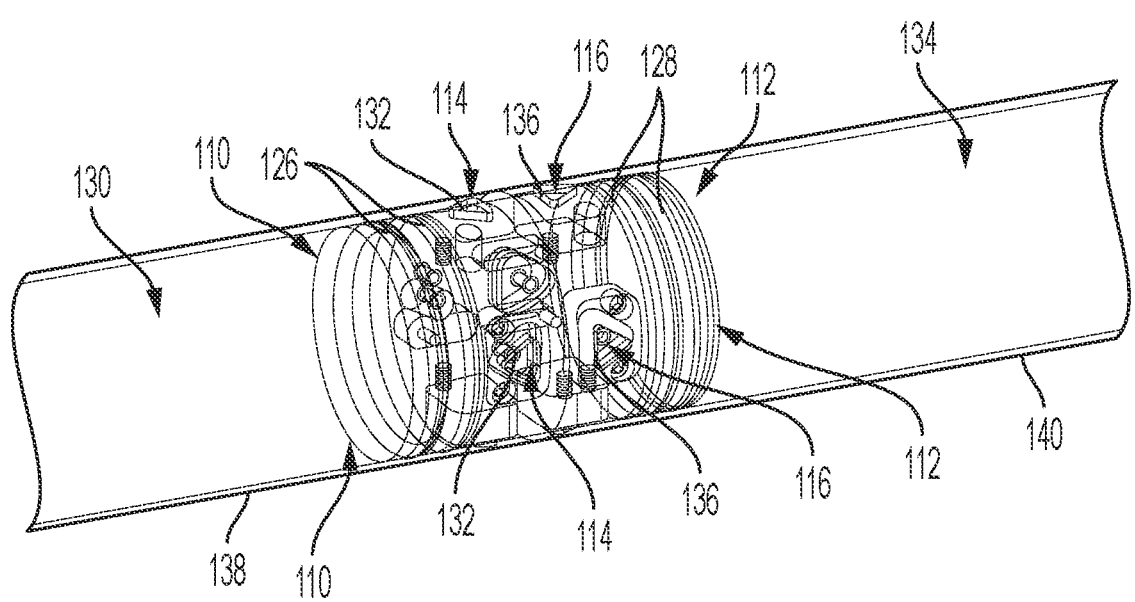
FIG. 3 is a transparent isometric view of FIG. 2 showing the engagement of the hollow carbon fiber composite structures by the universal coupling.

FIGS. 1-3 depict one embodiment of a universal coupling 100 and its use in accordance with one embodiment. The universal coupling 100 as seen in FIG. 1 comprises a body 102 having a first mating end region 104, a second mating end region 106, and at least one body sidewall 108. The first mating end region 104 has first mating end 110. The second mating end region 106 has a second mating end 112 and is at the opposite end of the body 102 from the first mating end region 104 and the first mating end 110. The at least one body sidewall 108 spans therebetween and structurally connects the first mating end region 104 and first mating end 110 with the second mating end region 106 and second mating end 112.

While, the universal coupling 100 is designed to couple hollow carbon fiber composite structures, the universal coupling 100 itself may or may not be made of carbon fiber composite. In certain embodiments, the body 102 of the coupling can be formed of metal or alloy. In some such embodiments, the body is formed of machined aluminum. The shape, configuration, and size of the universal coupling 100 depends on the shape, configuration, and size of the hollow carbon fiber composite structures being coupled. In the example of FIG. 1, the body 102 has a cylindrical shape with a circular cross-section and a singular instance of the at least one body sidewall 108. Other cross-sectional shapes may require additional instances of the at least one body sidewalls 108. For example, a triangular cross-sectional shape may involve three instances of the at least one body sidewalls 108. A square cross-sectional shape may involve four instances of the at least one body sidewalls 108. Other possible shapes and sidewall numbers will be apparent to one skilled in the art given the benefit of this disclosure.

At least one first mating end catch 114 is disposed in the at least one body sidewall 108 at the first mating end region 104. The at least one first mating end catch 114 reciprocates by extending outward from the body 102 to an engaged position and retracting inward to the body 102 to a dis-engaged position. In certain embodiments, as seen in FIG. 1, there are a plurality of first mating end catches 114 disposed around the body 102 in the first mating end region 104. The number and configuration of first mating end catches 114 can vary based on the application.

At least one second mating end catch 116 is disposed in the at least one body sidewall 108 at the second mating end region 106. The at least one second mating end catch 116 reciprocates by extending outward from the body 102 to an engaged position and retracting inward to the body 102 to a dis-engaged position. In certain embodiments, as seen in FIG. 1, there are a plurality of second mating end catches 116 disposed around the body 102 in the second mating end region 106. The number and configuration of second mating end catches 116 can vary based on the application.

In the embodiment of FIG. 1, the first mating end catch 114 comprises a recess 118 in the sidewall 108 of the first mating end region 104 and a spring-loaded reciprocatable pin 120 disposed within the recess 118. In the example of FIG. 1, the recess 118 is substantially rectangular in shape while the pin 120 is substantially triangular in shape. However, the recess 118 and pin 120 can have any number of shapes and configurations as will be apparent to one skilled in the art given the benefit of this disclosure. In certain embodiments the spring-loaded reciprocatable pin 120 is part of an assembly that is secured in the recess 118 using one or more fasteners such as screw fasteners 122. This configuration allows the first mating end catch 114 to be swapped out or replaced as necessary for a particular application.

In the example of FIG. 1, the second mating end catch 116 comprises the same components as found in the firsts mating end catch 114 but disposed within a recess 124 with a reverse orientation for the second mating end region 106. This allows the same assembly to be used for both the first mating end catch 114 and the second mating end catch 116. However, it should be understood that the second mating end catch 116 does not have to have the same configuration as the first mating end catch 114. Indeed, in certain embodiments, where there are multiple configurations, each instance of a catch could have a different shape or configuration.

In certain embodiments, the universal coupling 100 further includes a first seal 126, in this case two gaskets, in the first mating end region 104 and a second seal 128, in this case two gaskets, in the second mating end region 106.

FIG. 2 and FIG. 3 depict a first hollow carbon fiber composite structure 130 coupled having at least one first receiving feature 132 to a second hollow carbon fiber composite structure 134 having at least one second receiving feature 136 using a universal coupling 100.

The at least one first mating end catch 114 is structurally sized and positioned in such a way that engages the first receiving feature 132 of the first hollow carbon fiber composite structure 130 when the first mating end 110 is placed in a predetermined coupled position and orientation inside the first hollow carbon fiber composite structure 130 with the at least one first mating end catch 114 in the engaged position into the first receiving feature 132. The at least one second mating end catch 116 is structurally sized and positioned in such a way that engages the second receiving feature 136 of the second hollow carbon fiber composite structure 134 when the second mating end 112 is placed in a predetermined coupled position and orientation inside the second hollow carbon fiber composite structure 134 with the at least one second mating end catch 116 in the engaged position into the second receiving feature 136.

In some embodiments, the first receiving feature 132 comprises a first aperture. In certain embodiments, when the at least one first mating end catch 114 engages the first receiving feature 132 of the first hollow carbon fiber composite structure 130 in the engaged position, the at least one first mating end catch 114 is sized and configured in such a way that it is flush with an outer wall 138 of the first hollow carbon fiber composite structure 130 at the first receiving feature 132.

Similarly, in some embodiments, the second receiving feature 136 comprises a second aperture. In certain embodiments, when the at least one second mating end catch 116 engages the second receiving feature 136 of the second hollow carbon fiber composite structure 134 in the engaged position, the at least one second mating end catch 116 is sized and configured in such a way that it is flush with an outer wall 140 of the second hollow carbon fiber composite structure 134 at the second receiving feature 136.

Figure 4:
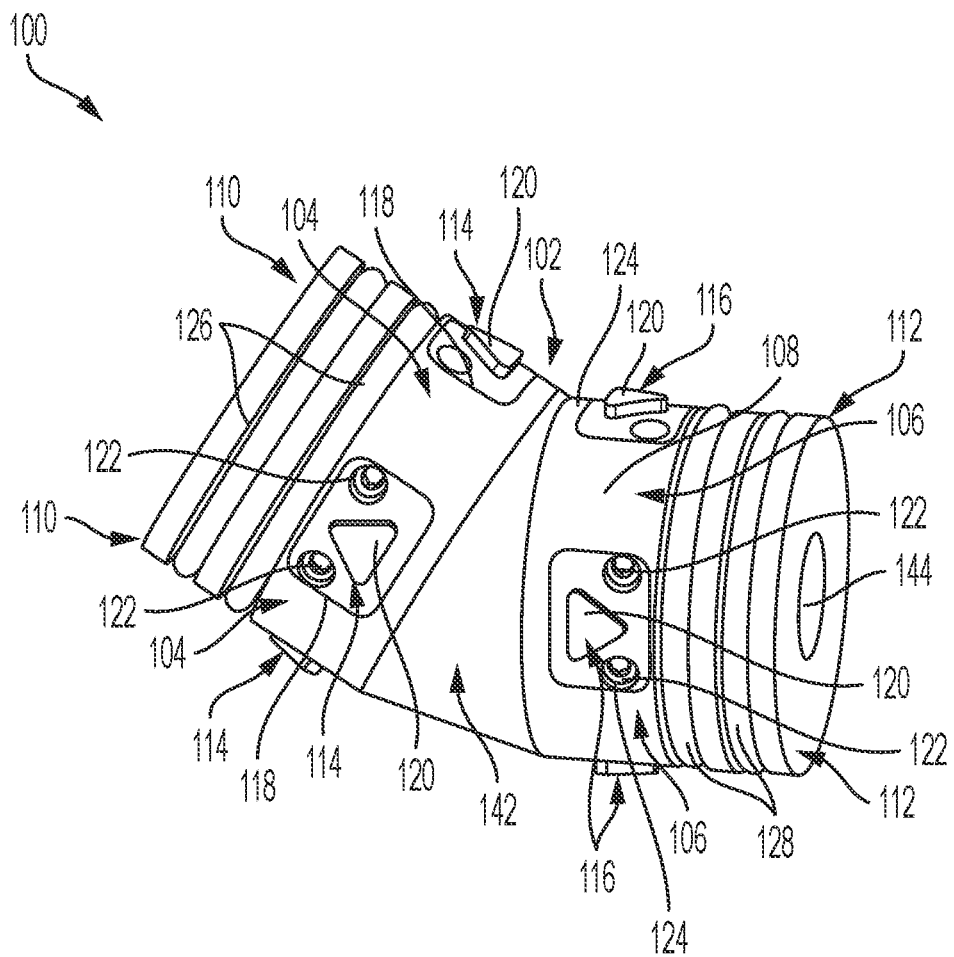
FIG. 4 is an isometric view of an example universal coupling having an elbow bend in the body of the universal coupling in accordance with an embodiment of the present invention.
Figure 5:
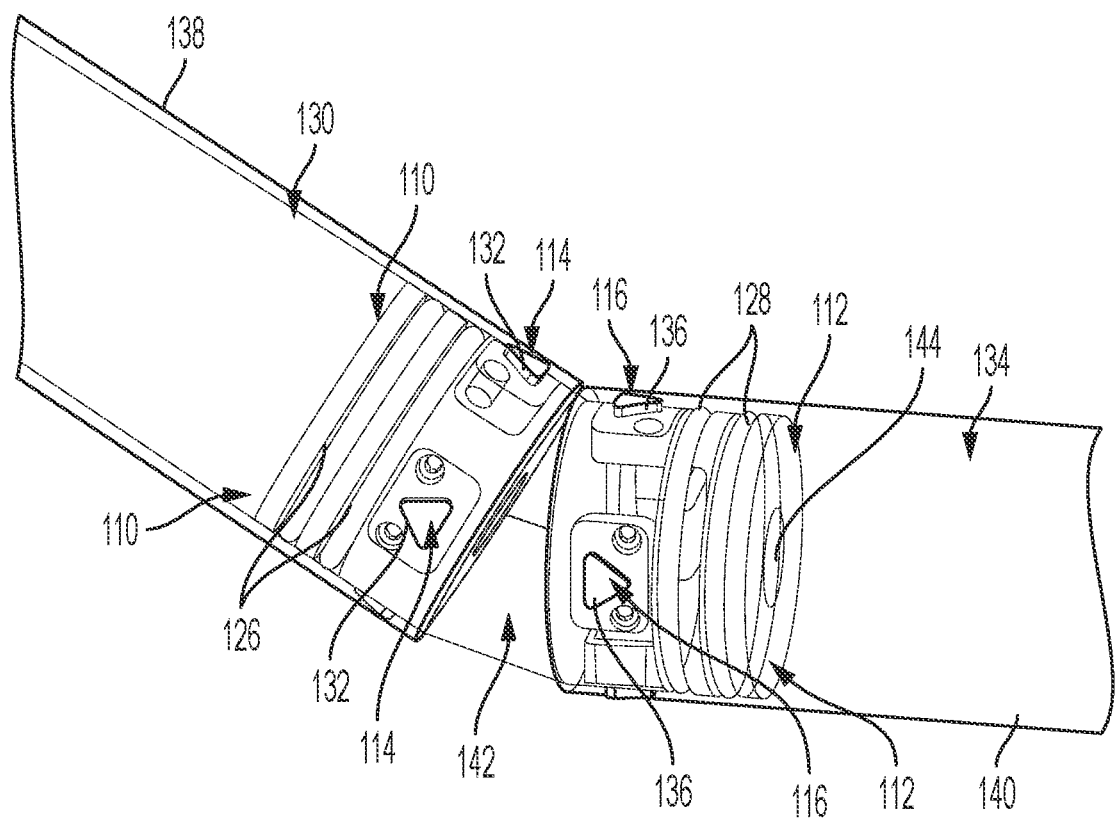
FIG. 5 is a transparent isometric view of two hollow carbon fiber composite structures being coupled with the universal coupling of FIG. 4 showing the engagement of the hollo carbon fiber composite structures by the universal coupling.

FIG. 4 and FIG. 5 depict an embodiment of the universal coupling 100 further including an elbow 142. FIG. 4 depicts the universal coupling 100. FIG. 5 depicts a first hollow carbon fiber composite structure 130 coupled to a second hollow carbon fiber composite structure 134 at an angle using the universal coupling 100 of FIG. 4. In this embodiment, the at least one body sidewall 108 has and elbow form such that the first hollow carbon fiber composite structure 130 is coupled to the second first hollow carbon fiber composite structure 134 at an angle. It will be understood by those skilled in the art that any number of angles and elbow forms are possible.

In certain embodiments, the body 102 further comprises a through hole or passage 144 extending from a first mating end 110 to the second mating end 112. The through hole can allow the passage of fluids or gases from the first hollow carbon fiber composite structure 130 to the second hollow carbon fiber composite structure 134, or vice versa, through the universal coupling 100. In such instances, a provided first seal 126 may create a fluid tight seal between the first mating end region 104 of the universal coupling 100 and the first hollow carbon fiber composite structure 130 while a provided second seal 128 creates a fluid tight seal between the second mating end region 106 of the universal coupling 100 and the second hollow carbon fiber composite structure 134.

Figure 6:
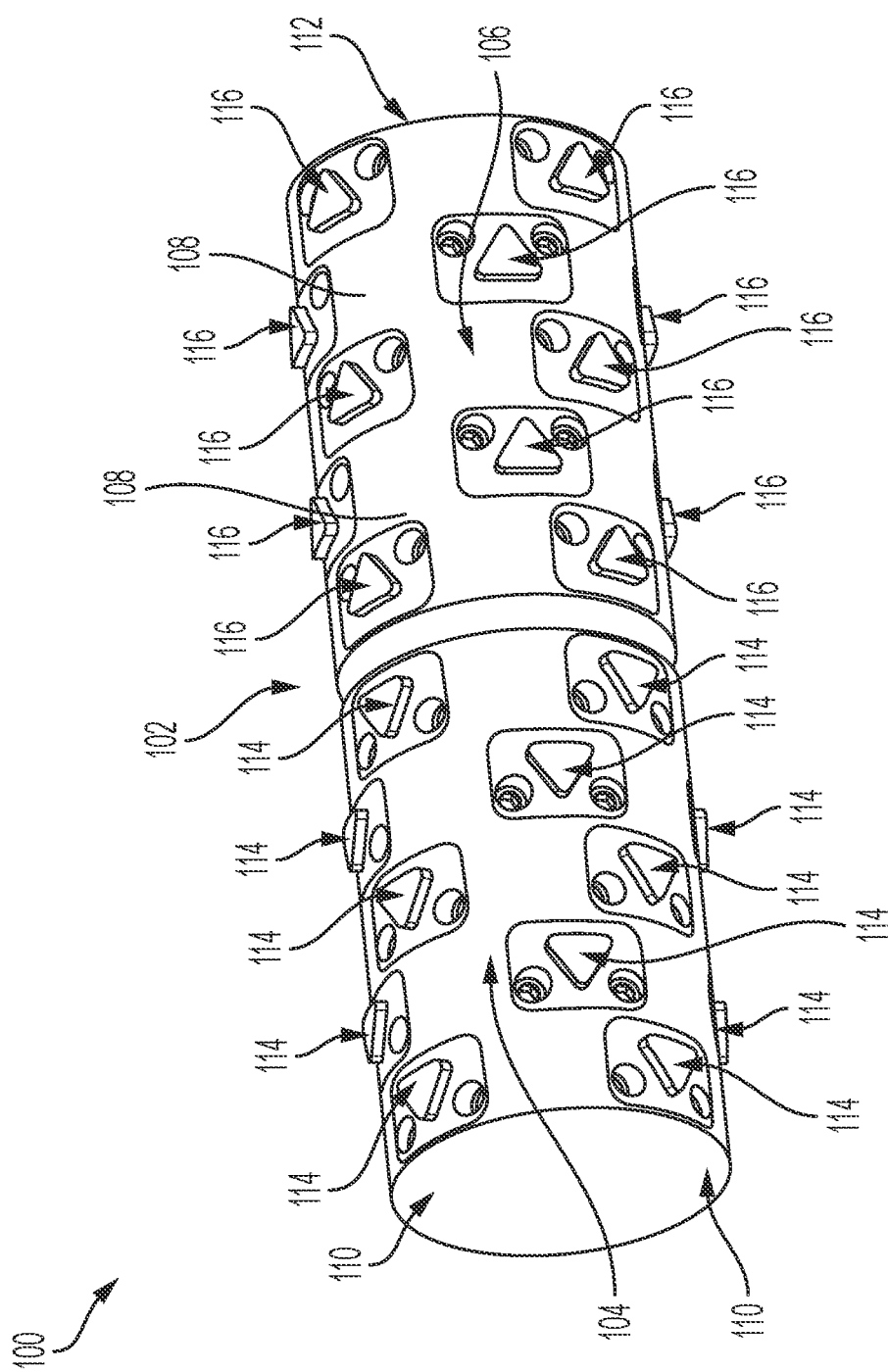
FIG. 6 is an isometric view of an example universal coupling having multiple rows of catches in accordance with an embodiment of the present invention.
Figure 7:
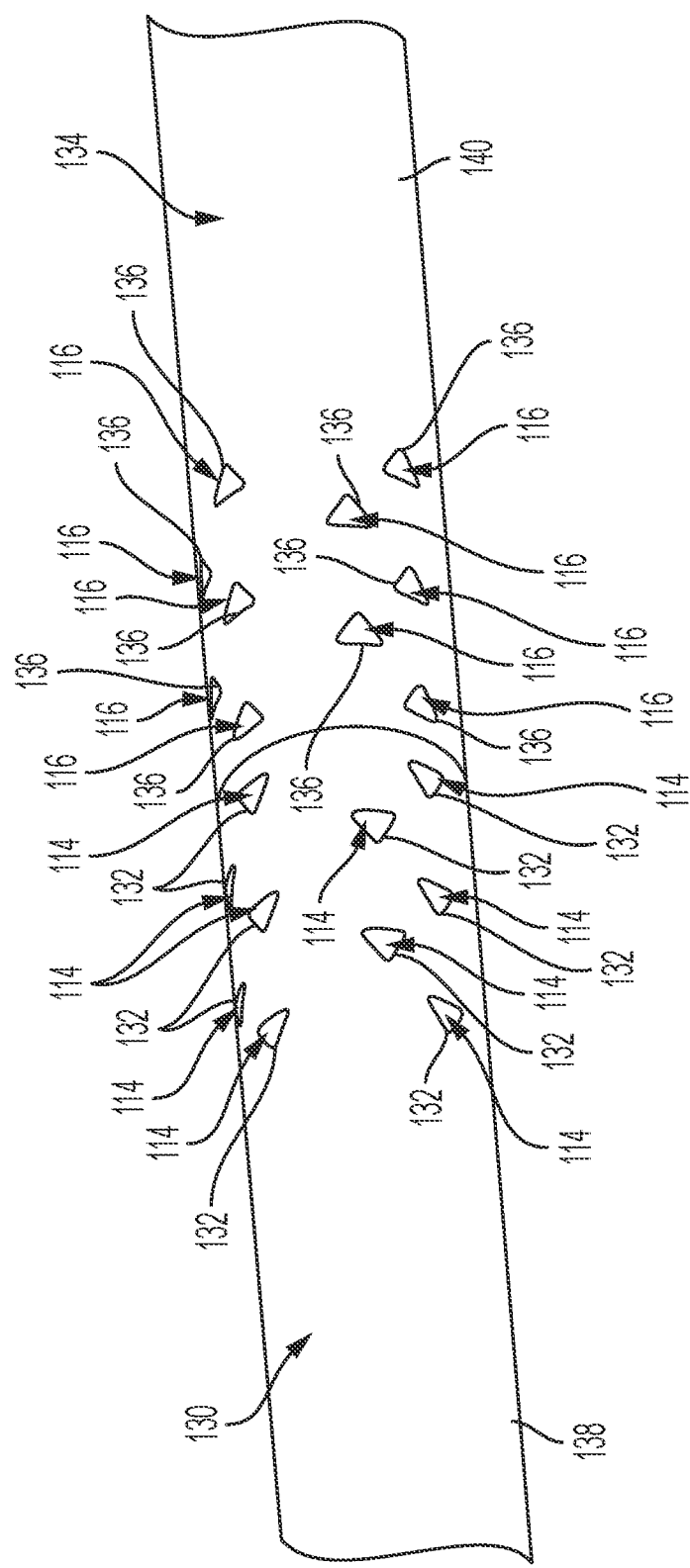
FIG. 7 is an isometric view of two hollow carbon fiber composite structures being coupled with the universal coupling of FIG. 6.

FIG. 6 and FIG. 7 depict an embodiment of the universal coupling 100 further including multiple rows of multiple first mating end catches 114 and second mating end catches 116. FIG. 6 depicts the universal coupling 100. FIG. 7 depicts a first hollow carbon fiber composite structure 130 coupled to a second hollow carbon fiber composite structure 134 at using the universal coupling of FIG. 6. In this embodiment, the first mating end region 104 of the universal coupling 100 has a plurality of rows having a plurality of first mating end catches 114. Similarly, the second mating end region 106 of the universal coupling 100 has a plurality of rows having a plurality of second mating end catches 116. As seen in FIG. 7, the first hollow carbon fiber composite structure 130 of this embodiment has a plurality of rows having a plurality of first receiving features 132 while the second hollow carbon fiber composite structure 134 has a plurality of rows having a plurality of second receiving features 136. When assembled, the first receiving features 132 of the first hollow carbon fiber composite structure are engaged by the first mating end catches 114 while the second receiving features 136 are engaged by the second mating end catches 116. Such embodiments can be used to join a first hollow carbon fiber composite structure 130 to a second hollow carbon fiber composite structure 134 in application where there will be increased forces applied to the hollow carbon fiber composite structures 130, 134 that could separate the hollow carbon fiber composite structures 130, 134. It will be apparent to one skilled in the art given the benefit of this disclosure that any number of rows with each row having any number of catches can be provided.

Figure 8:
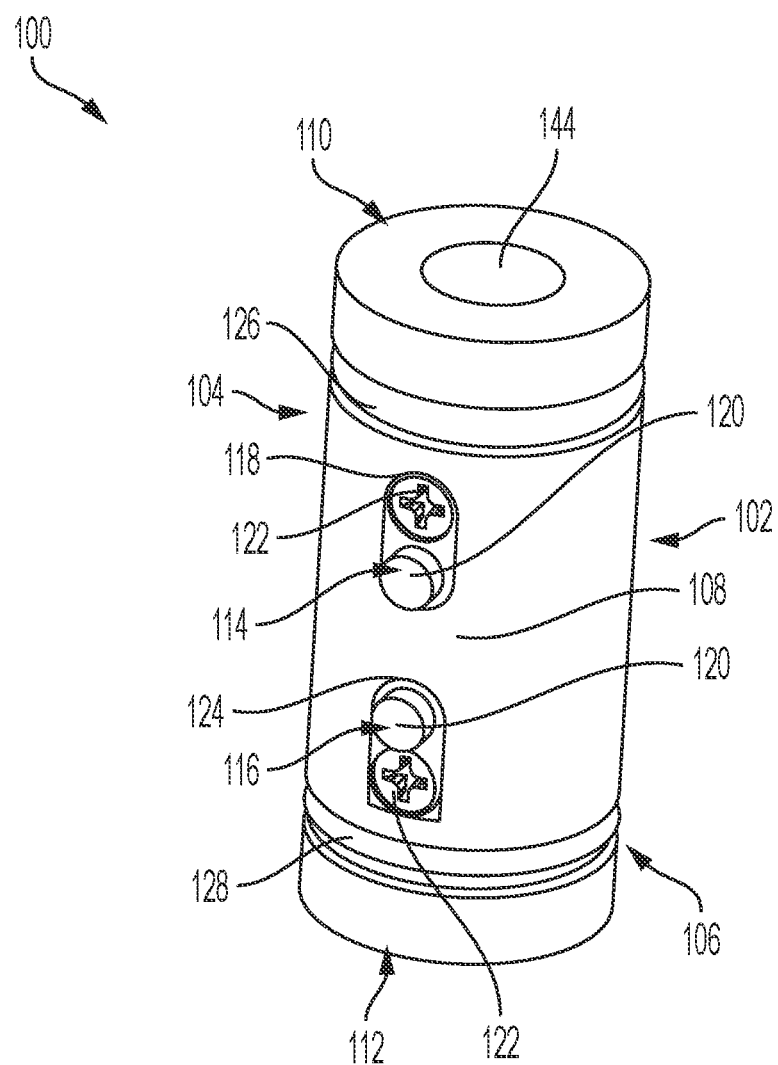
FIG. 8 is an isometric view of another example universal coupling in accordance with an embodiment of the present invention.
Figure 9:
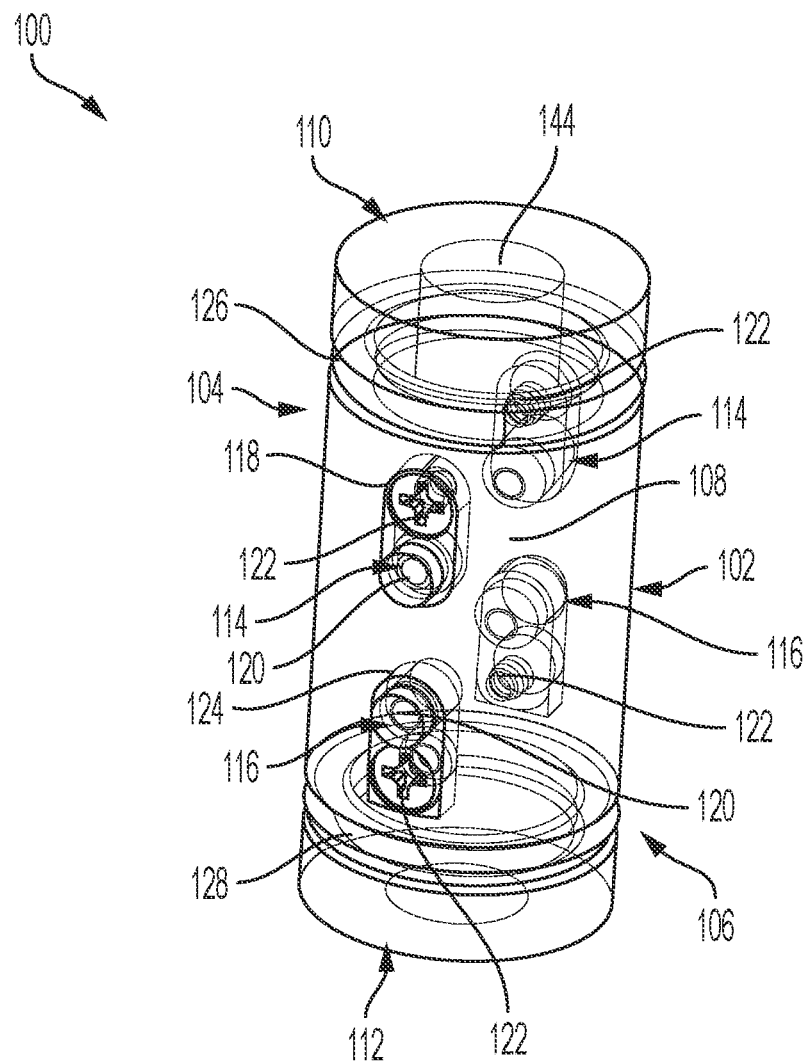
FIG. 9 is a transparent isometric view of the universal coupling of FIG. 8 in accordance with an embodiment of the present invention.

FIG. 8 and FIG. 9 depict an embodiment of the universal coupling 100 with and alternate configuration for the first mating end catch 114 and the second mating end catch 116. In this embodiment, the first mating end region 104 of the coupling 100 has at least one first mating end catch 114 with a cylindrically shaped reciprocatable pin 120. Similarly, the second mating end region 106 of the universal coupling 100 also has at least one second mating end catch 116 with a cylindrically shaped reciprocatable pin 120. Here the assembly containing the respective catches 114, 116 is secured in the respective recess 118, 124 using a single screw fastener 122. This embodiment also has a through hole or passage 144 through the body 102 of the universal coupling 100 as well as first seal 126 and second seal 128.

Figure 10:
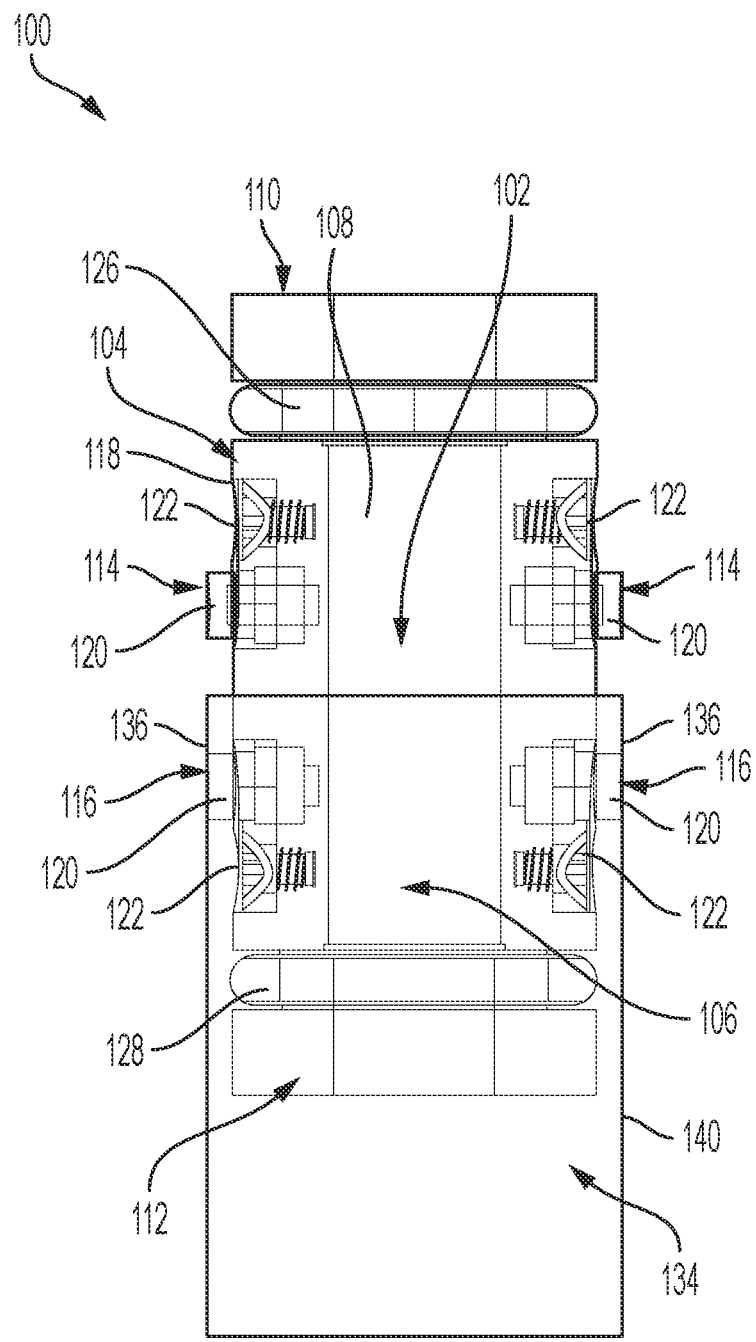
FIG. 10 is a transparent side view showing the engagement of a hollow carbon fiber composite structures by the universal coupling of FIG. 8 in accordance with aspects of the present invention.
Figure 11:
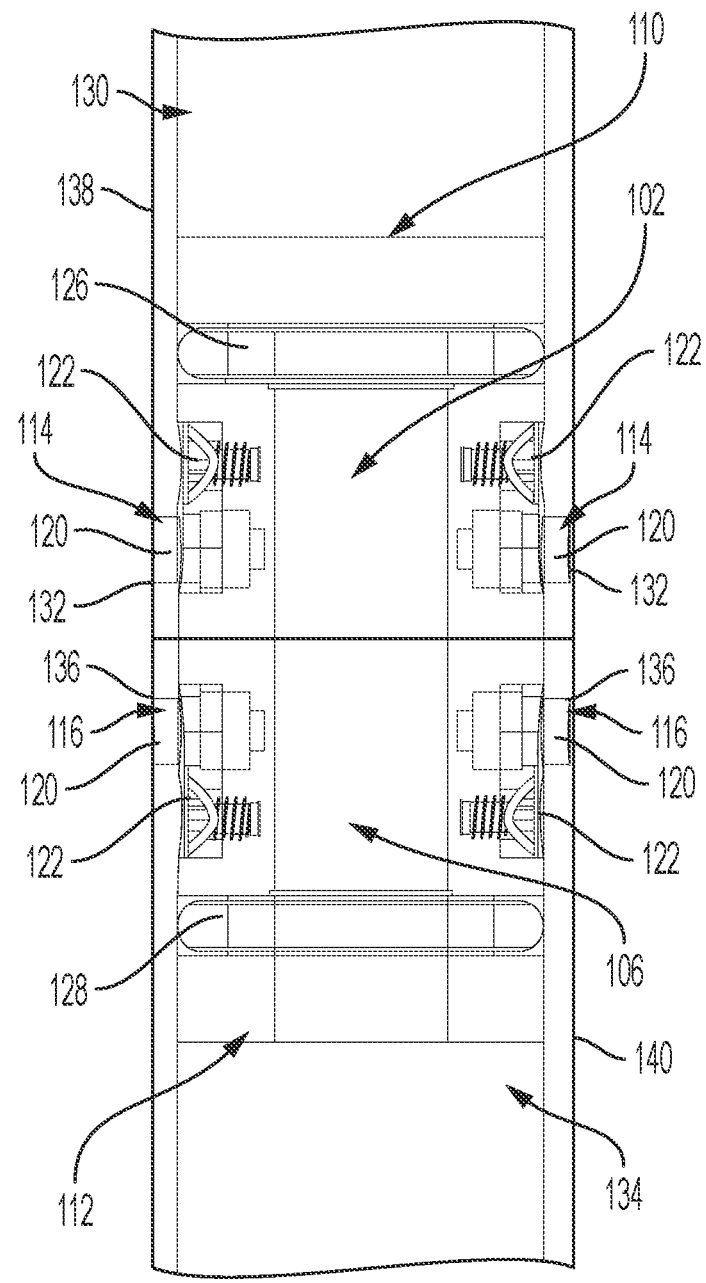
FIG. 11 is a transparent side view of two hollow carbon fiber composite structures being coupled with the universal coupling of FIG. 8 in accordance with aspects of the present invention.

FIG. 10 and FIG. 11 show the universal coupling 100 of FIG. 8 and FIG. 9 used in the coupling of hollow carbon fiber composite structures 130, 134. FIG. 10 shows a second hollow carbon fiber composite structure 134 placed over the second mating end 112 of the universal coupling 100 wherein the second receiving features 136 are engaged by the second mating end catches 116. FIG. 11 shows the addition of a first hollow carbon fiber composite structure 130 placed over the first mating end 110 of the universal coupling 100 wherein the first receiving features 132 are engaged by the first mating end catches 114 resulting in the first hollow carbon fiber composite structure 130 being coupled to the second hollow carbon fiber composite structure 134.

Figure 12:
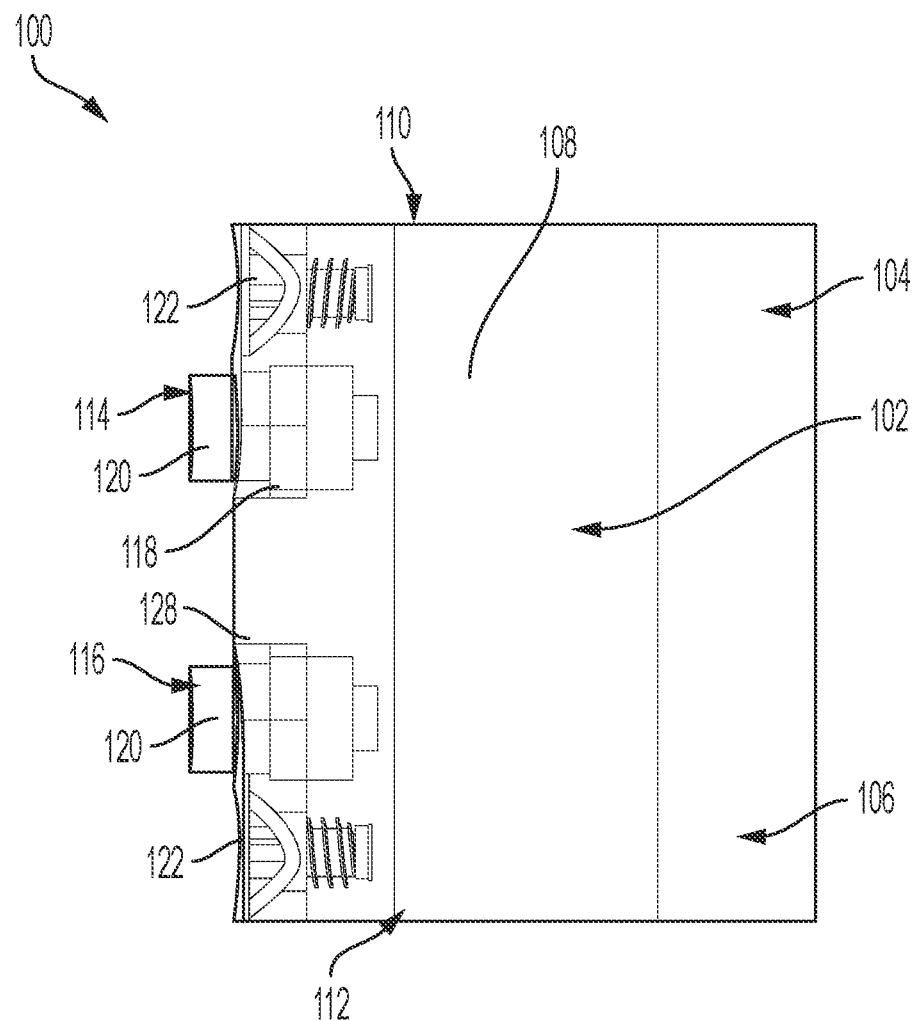
FIG. 12 is a transparent side view of another example universal coupling in accordance with an embodiment of the present invention.

FIG. 12 depicts an embodiment of the universal coupling 100. In this embodiment, there is a single first mating end catch 114 moved in closer proximity to the first mating end 110. There is also a singular second mating end catch 116 moved in closer proximity to the second mating end 112.

Figure 13:
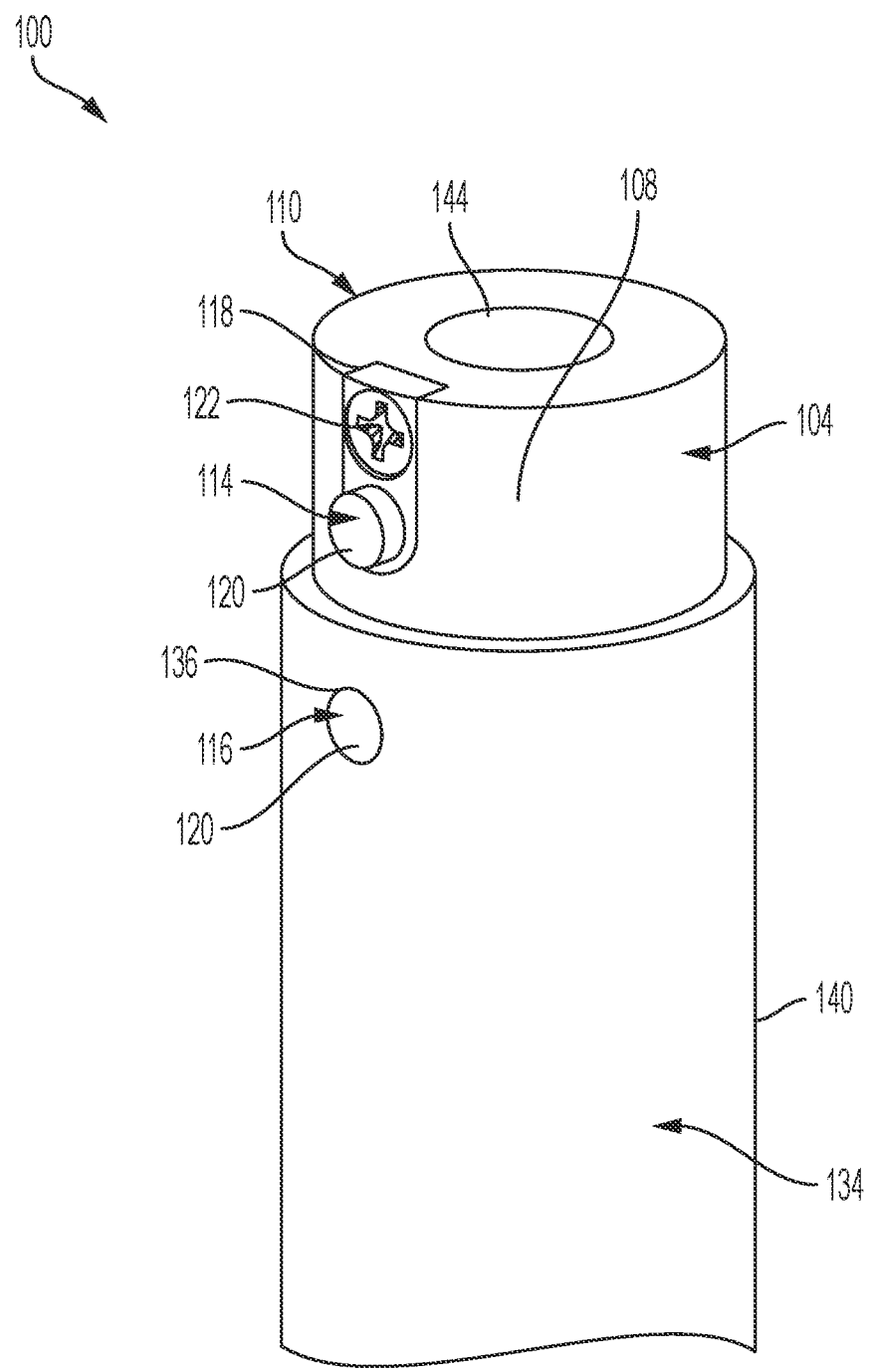
FIG. 13 is an isometric view showing the engagement of a hollow carbon fiber composite structures by the universal coupling of FIG. 12 in accordance with aspects of the present invention.
Figure 14:
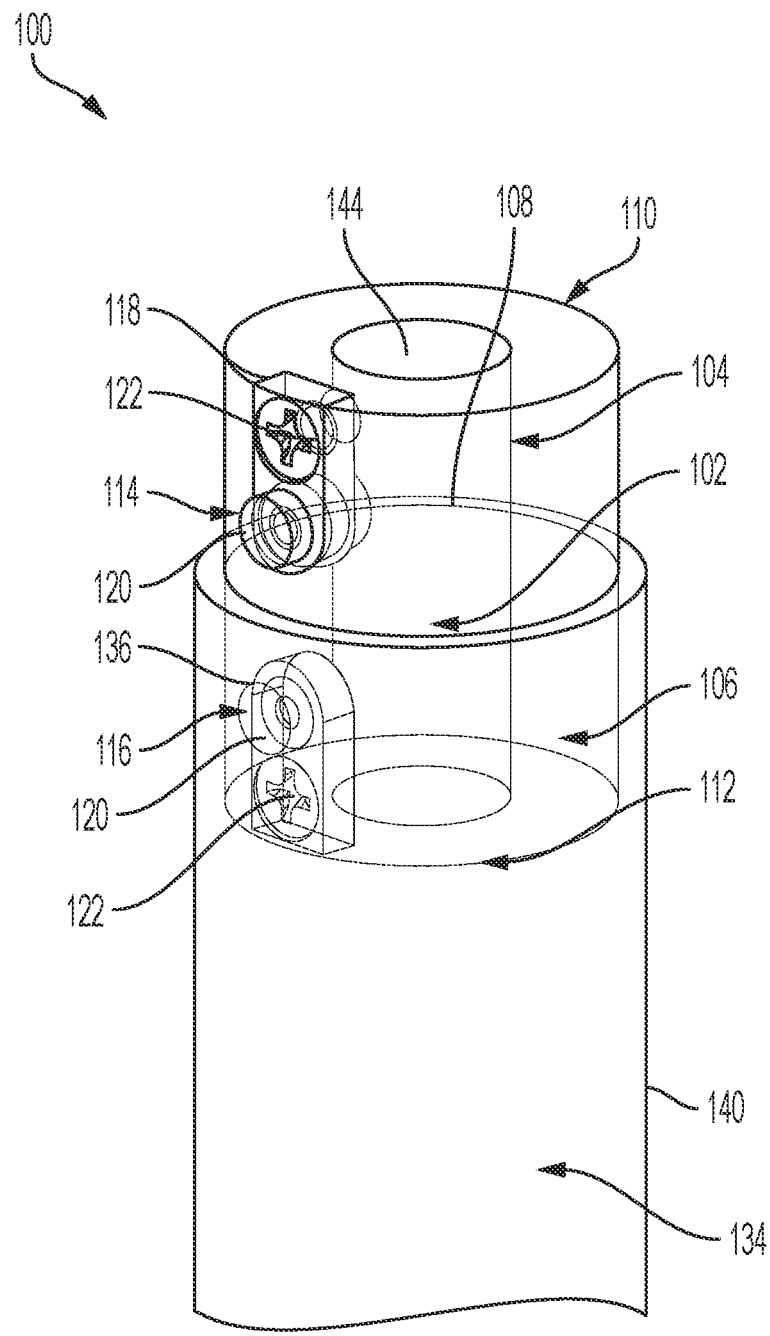
FIG. 14 is a transparent view of FIG. 13 showing the engagement of a hollow carbon fiber composite structures by the universal coupling in accordance with aspects of the present invention.

FIG. 13 and FIG. 14 show a second hollow carbon fiber composite structure 134 placed over the second mating end 112 of the universal coupling 100 and the engagement of the second receiving feature engaged by the second mating end catch 116. In this embodiment, the second mating end catch 116 is flush with the outer wall 140 of the second hollow carbon fiber composite structure when the first mating end catch 116 has engaged the second receiving feature 136 of the second hollow carbon fiber composite structure 134.

Figure 15:
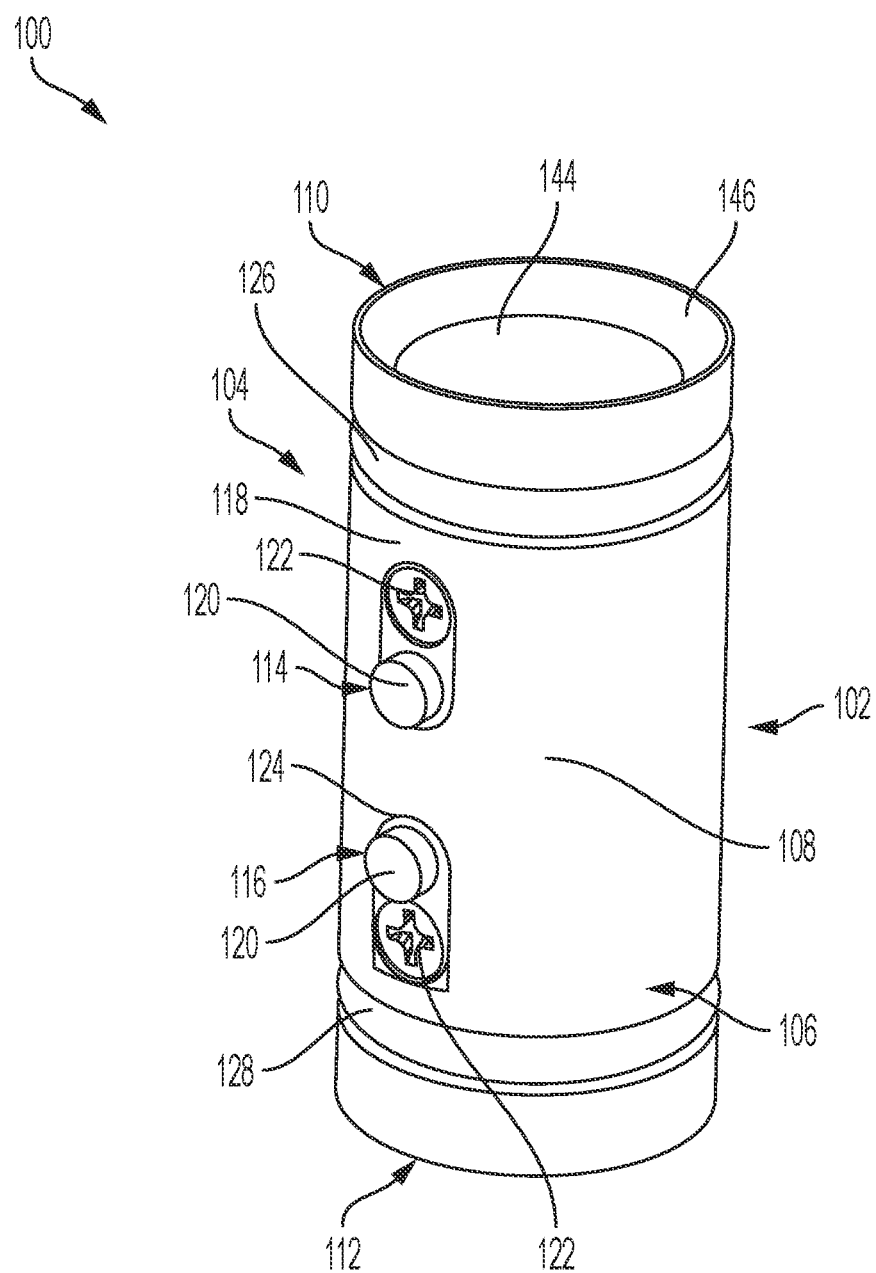
FIG. 15 is a perspective view of another example universal coupling having a through hole in the body of the universal coupling in accordance with an embodiment of the present invention.
Figure 16:
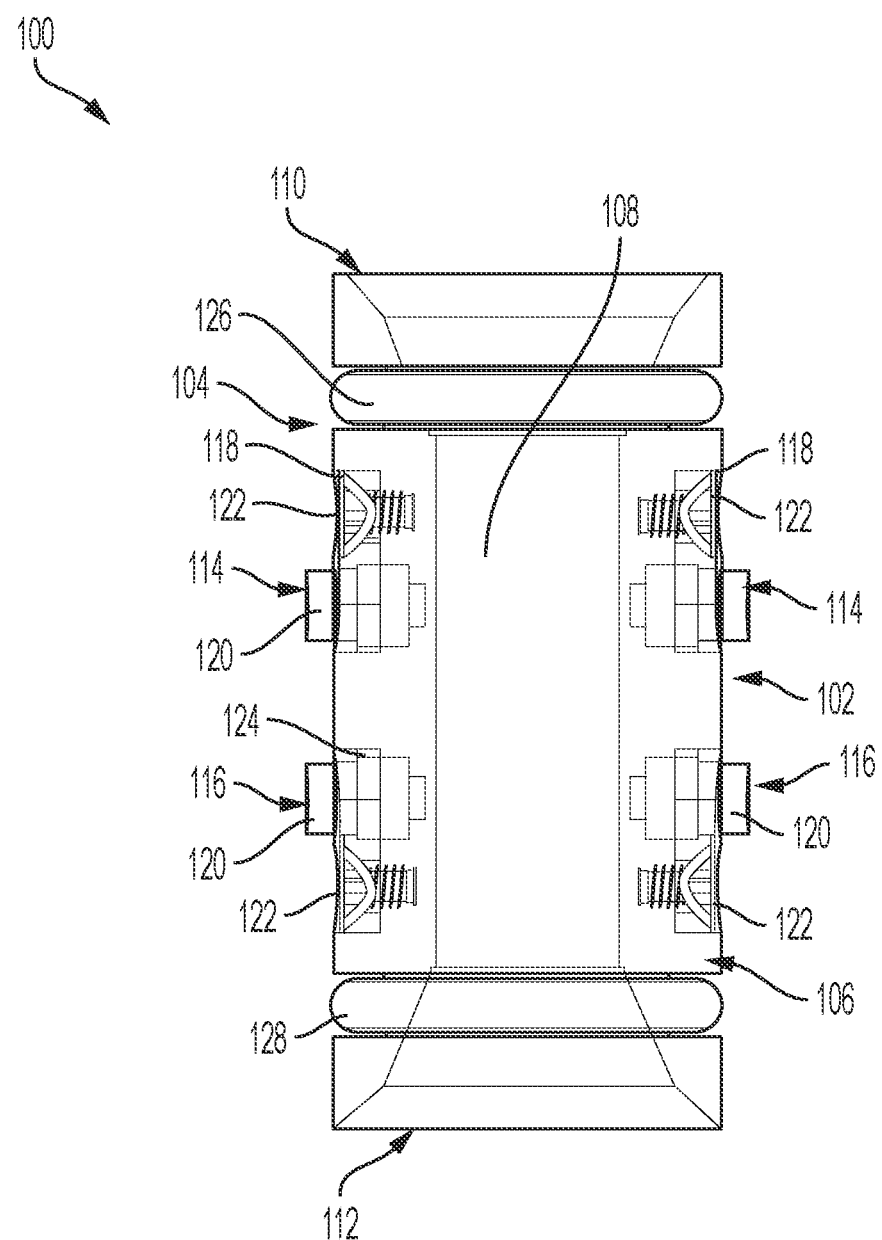
FIG. 16 is a transparent side view the universal coupling of FIG. 15.
Figure 17:
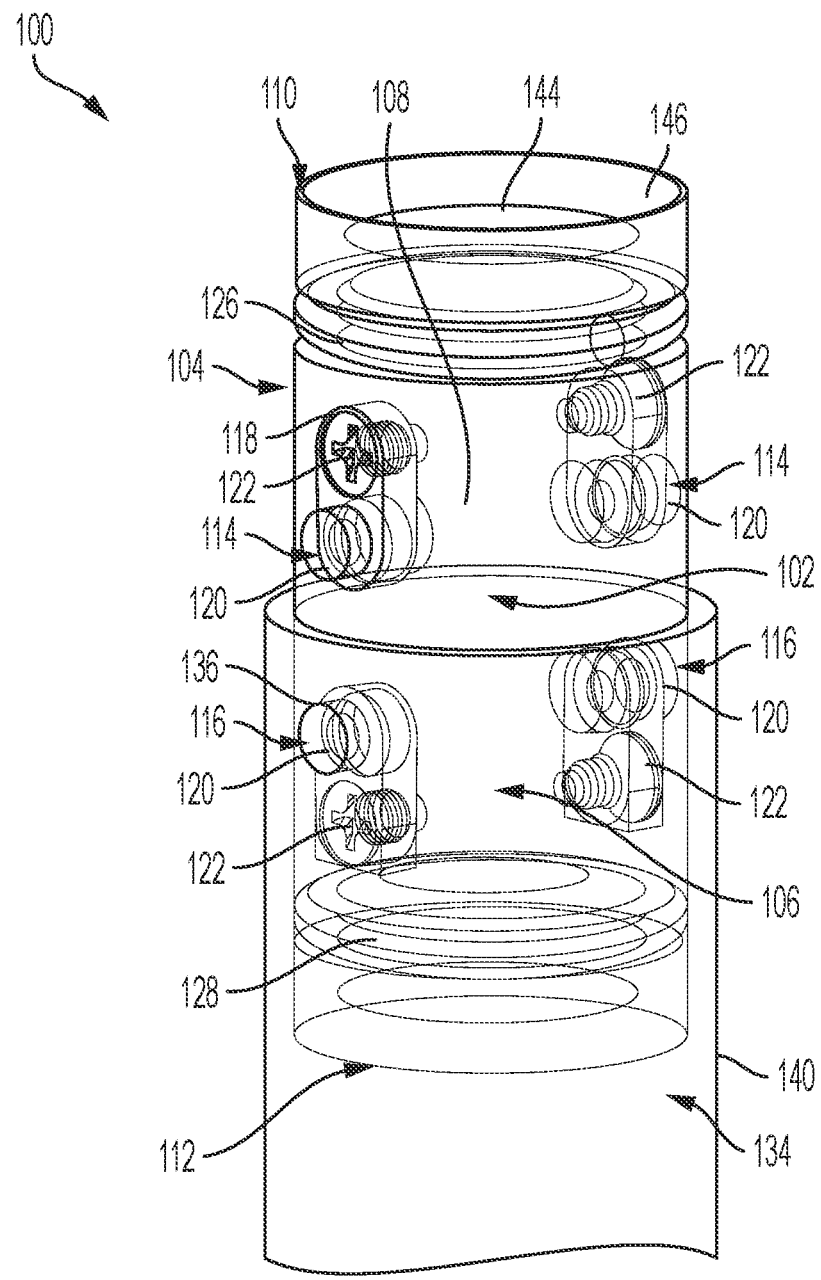
FIG. 17 is a transparent isometric view showing the engagement of a hollow carbon fiber composite structures by the universal coupling of FIG. 15 in accordance with aspects of the present invention.

FIG. 15-17 depicts an embodiment similar to the embodiment of FIGS. 8-10 but having a larger hole or passage 144 through the body 102 of the universal coupling 100 with a flared opening 146. FIG. 15 shows the coupling 100 in isolation. FIG. 16 shows a transparent view of the universal coupling 100. FIG. 17 shows a second hollow carbon fiber composite structure 134 placed over the second mating end 112 of the universal coupling 100 wherein the second receiving features 136 are engaged by the second mating end catches 116.

Figure 18:
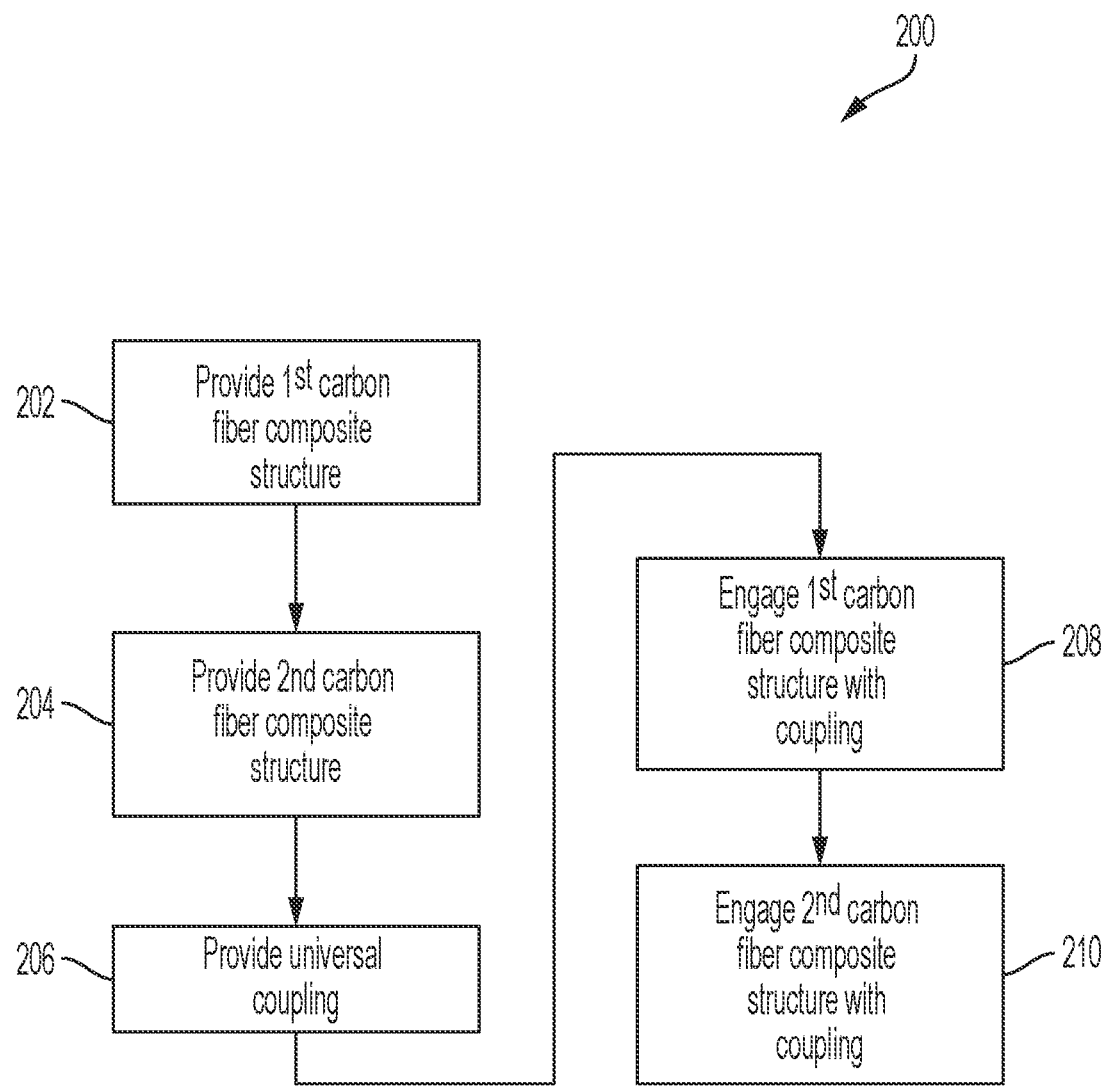
FIG. 18 is an example flow diagram of a method for coupling two hollow carbon fiber components using a universal coupling in accordance with embodiments of the present invention.

FIG. 18 depicts a flow chart of an example method 200 for removably and replaceably coupling a first hollow carbon fiber composite structure 130 having a first receiving feature 132 and a second hollow carbon fiber composite structure 134 having a second receiving feature 136 without requiring adhesive or welding. The first step of the method is providing a first hollow carbon fiber composite structure 130 having a first receiving feature 132 (Step 202). A second hollow carbon fiber composite structure 134 having a second receiving feature 136 is also provided (Step 204). A universal coupling 100 as set forth and described herein is then provided (Step 206). The first mating end 110 is then placed inside the first hollow carbon fiber composite structure 130 and the at least one first receiving feature 132 of the first hollow carbon fiber composite structure 130 is engaged with the at least one first mating end catch 114 of the first mating end region 104 (Step 208). The second mating end mating end 112 is then placed inside the second hollow carbon fiber composite structure 134 and the at least one second receiving feature 136 of the second hollow carbon fiber composite structure 134 is engaged with the at least one second mating end catch 116 of the second mating end region 106 (Step 210). This results in the removable and replaceable coupling of the first hollow carbon fiber composite structure 130 with the second hollow carbon fiber composite structure 134 without requiring adhesive or welding.

Figure 19:
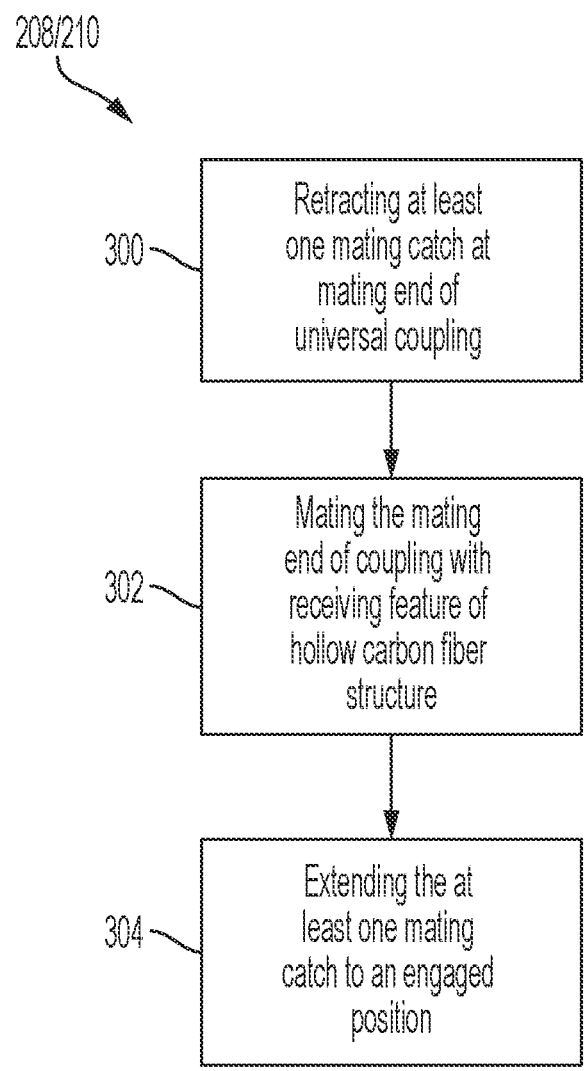
FIG. 19 is an example flow diagram depicting the steps involved in engaging a hollow carbon fiber composite structure with a universal coupling in accordance with embodiments of the present invention.

In certain embodiments, engaging a receiving feature 132, 136 with a mating end catch 114, 116 (steps 208 and 210) can involve additional steps. An example of this is shown in FIG. 19. Here first additional step is retracting the at least one mating end catch (either the first mating end catch 114 or the second mating end catch 116) to a disengaged position (Step 300). Then, the mating end (either the first mating end 110 or the second mating end 112) is mated with a receiving feature (either the first receiving feature 132 or second receiving feature 136) of the corresponding hollow carbon fiber composite structure (the first hollow carbon fiber composite structure 130 for a first receiving feature 132 or the second hollow carbon fiber composite structure 134 for a second receiving feature 136), wherein the hollow carbon fiber composite structure is in a predetermined coupled position and orientation (Step 302). The at least one mating end catch (the previously selected first mating end catch 114 or the second mating end catch 116) is then extended to an engaged position (step 304).

Figure 20:
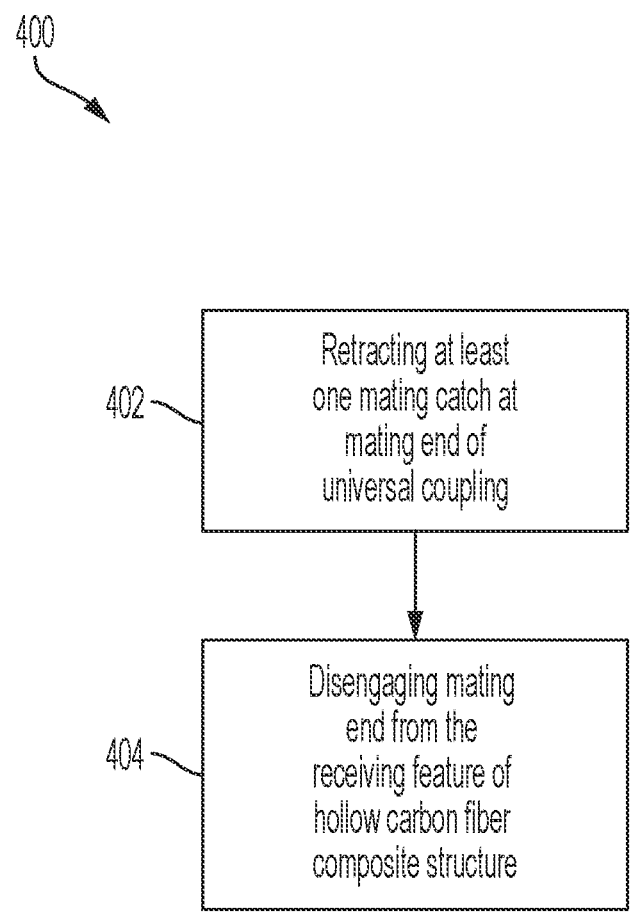
FIG. 20 is an example flow diagram depicting the steps involved in disengaging a hollow carbon fiber composite structure from a universal coupling in accordance with embodiments of the present invention.

As the coupling provided by the universal coupling 100 is removable and replaceable, certain embodiments may require the uncoupling of one or more of the hollow carbon fiber composite structures. An example method 400 of how this can be accomplished is shown in FIG. 20. The first step is retracting any mating end catches at a mating end (at least one first mating end catch 114 at the first mating end 110 or at least one second mating end catch 116 at the second mating end 112) of the universal coupling 100 (Step 402). The mating end is then disengaged from the receiving feature of hollow carbon fiber composite structure being removed (the first mating end 110 from the first receiving feature 132 for the first hollow carbon fiber composite structure 130 or the second mating end 112 from the second receiving feature 136 for the second hollow carbon fiber composite structure 134) (Step 404).

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A universal coupling system for removably and replaceably coupling hollow carbon fiber composite structures, the universal coupling system comprising:
   a first hollow carbon fiber composite structure having at least one first receiving feature;
   a second hollow carbon fiber composite structure having at least one second receiving feature; and
   a universal coupling comprising:
      a body having a first mating end region having a first mating end, a second mating end region having a second mating end that are at an opposite end of the body from the first mating end region and the first mating end, and at least one body sidewall spanning therebetween and structurally connecting the first mating end region and first mating end with the second mating end region and second mating end;

at least one first mating end catch disposed in the at least one body sidewall at the first mating end region, and which reciprocates by extending outward from the body to an engaged position and retracting inward to the body to a dis-engaged position; and at least one second mating end catch disposed in the at least one body sidewall at the second mating end region, and which reciprocates by extending outward from the body to an engaged position and retracting inward to the body to a dis-engaged position;

wherein the at least one first mating end catch is structurally sized and positioned in such a way that engages the at least one first receiving feature of the first hollow carbon fiber composite structure when the first mating end is placed in a predetermined coupled position and orientation inside the first hollow carbon fiber composite structure with the at least one first mating end catch in the engaged position into the at least one first receiving feature;

wherein the at least one second mating end catch is structurally sized and positioned in such a way that engages the at least one second receiving feature of the second hollow carbon fiber composite structure when the second mating end is placed in a predetermined coupled position and orientation inside the second hollow carbon fiber composite structure with the at least one second mating end catch in the engaged position into the at least one second receiving feature;

wherein the universal coupling is removable and replaceable and fixedly couples the first hollow carbon fiber composite structure with the second hollow carbon fiber composite structure without requiring adhesive or welding;

wherein at least one of the first mating end catch and second mating end catch comprises:
  a recess in the sidewall of the first mating end region or second mating end region; and
  a spring-loaded reciprocatable pin, disposed within the recess, that is part of an assembly secured in the recess using one or more fasteners allowing the at least one of the first mating end catch and second mating end catch to be swapped out or replaced as necessary for a particular application.

2. The universal coupling system of claim 1, wherein the universal coupling is manufactured of a material that is not required to be carbon fiber composite.

3. The universal coupling system of claim 2, wherein the body comprises machined aluminum.

4. The universal coupling system of claim 1, wherein the body further comprises a through hole extending from the first mating end to the second mating end.

5. The universal coupling system of claim 4, further comprising a first seal at the first mating end region and a second seal at the second mating end region, the first seal creating a fluid-tight seal between the first mating end region of the universal coupling and the first hollow carbon fiber composite structure, the second seal creating a fluid-tight seal between the second mating end region of the universal coupling and the second hollow carbon fiber composite structure.

6. The universal coupling system of claim 1, wherein when the at least one first mating end catch engages the at least first receiving feature of the first hollow carbon fiber composite structure in the engaged position, the at least one first mating end catch is sized and configured in such a way that it is flush with an outer wall of the first hollow carbon fiber composite structure at the at least one first receiving feature.

7. The universal coupling system of claim 1, wherein when the at least one second mating end catch engages the at least one second receiving feature of the first hollow carbon fiber composite structure in the engaged position, the at least one second mating end catch is sized and configured in such a way that it is flush with an outer wall of the first hollow carbon fiber composite structure at the at least one second receiving feature.

8. The universal coupling system of claim 1, further comprising a plurality of first mating end catches and a plurality of second mating end catches.

9. The universal coupling system of claim 8, wherein one or more of the plurality of first mating end catches and a plurality of second mating end catches comprises one or more rows each having multiple mating end catches.

10. The universal coupling system of claim 1, wherein the at least one first receiving feature comprises at least one first aperture and the at least one second receiving feature comprises at least one second aperture.

11. The universal coupling system of claim 1, wherein the at least one body sidewall has an elbow form such that the first hollow carbon fiber composite structure is coupled to the second first hollow carbon fiber composite structure at an angle.

12. The universal coupling system of claim 1, wherein the spring-loaded reciprocatable pin is substantially triangular in shape.

13. A method of removably and replaceably coupling a first hollow carbon fiber composite structure having at least one first receiving feature and a second hollow carbon fiber composite structure having at least one second receiving feature without requiring adhesive or welding, the method comprising:

providing a first hollow carbon fiber composite structure having a first receiving feature;

providing a second hollow carbon fiber composite structure having a second receiving feature;

providing a universal coupling comprising:
  a body having a first mating end region having a first mating end, a second mating end region having a second mating end that are at an opposite end of the body from the first mating end region and the first mating end, and at least one body sidewall spanning therebetween and structurally connecting the first mating end region and first mating end with the second mating end region and second mating end;

at least one first mating end catch disposed in the at least one body sidewall at the first mating end region, and which reciprocates by extending outward from the body to an engaged position and retracting inward to the body to a dis-engaged position; and at least one second mating end catch disposed in the at least one body sidewall at the second mating end region, and which reciprocates by extending outward from the body to an engaged position and retracting inward to the body to a dis-engaged position;

wherein the at least one first mating end catch is structurally sized and positioned in such a way that engages the at least one first receiving feature of the first hollow carbon fiber composite structure when the first mating end is placed in a predetermined coupled position and orientation inside the first hollow carbon fiber composite structure with the at least one first mating end catch in the engaged position into the at least one first receiving feature; and wherein the at least one second mating end catch is structurally sized and positioned in such a way that engages the at least one second receiving feature of the second hollow carbon fiber composite structure when the second mating end is placed in a predetermined coupled position and orientation inside the second hollow carbon fiber composite structure with the at least one second mating end catch in the engaged position into the at least one second receiving feature;

wherein at least one of the first mating end catch and second mating end catch comprises:
- a recess in the sidewall of the first mating end region or second mating end region; and
- a spring-loaded reciprocatable pin, disposed within the recess, that is part of an assembly secured in the recess using one or more fasteners allowing the at least one of the first mating end catch and second mating end catch to be swapped out or replaced as necessary for a particular application;

placing the first mating end inside the first hollow carbon fiber composite structure and engaging the at least one first receiving feature of the first hollow carbon fiber composite structure with the at least one first mating end catch of the first mating end region; and placing the second mating end inside the second hollow carbon fiber composite and structure engaging the at least one second receiving feature of the second hollow carbon fiber composite structure with the at least one second mating end catch of the second mating end region, resulting in the removable and replaceable coupling of the first hollow carbon fiber composite structure with the second hollow carbon fiber composite structure without requiring adhesive or welding.

14. The method of claim 13, wherein engaging the at least one first receiving feature of the first hollow carbon fiber composite structure with the at least one first mating end catch of the first mating end region comprises:
  retracting the at least one first mating end catch to a disengaged position;
  mating the first mating end with the first receiving feature of the first hollow carbon fiber composite structure, wherein the first hollow carbon fiber composite structure is in a predetermined coupled position and orientation; and
  extending the at least one first mating end catch to an engaged position.

15. The method of claim 13, wherein engaging the at least one second receiving feature of the second hollow carbon fiber composite structure with the at least one second mating end catch of the second mating end region comprises:
  retracting the at least one second mating end catch to a disengaged position;
  mating the second mating end with the second receiving feature of the second hollow carbon fiber composite structure, wherein the second hollow carbon fiber composite structure is in a predetermined coupled position and orientation; and
  extending the at least one second mating end catch to an engaged position.

16. The method of claim 13, further comprising uncoupling the first hollow carbon fiber composite structure, the uncoupling comprising:
  retracting the at least one first mating end catch to a disengaged position; and
  disengaging the first mating end from the at least one first receiving feature of the first hollow carbon fiber composite structure, wherein the first hollow carbon fiber composite structure is moved from the predetermined coupled position and orientation.

17. The method of claim 13, further comprising uncoupling the second hollow carbon fiber composite structure, the uncoupling comprising:
  retracting the at least one second mating end catch to a disengaged position; and
  disengaging the second mating end from the at least one second receiving feature of the second hollow carbon fiber composite structure, wherein the second hollow carbon fiber composite structure is moved from the predetermined coupled position and orientation.

* * * * *